(12) United States Patent
Sallot et al.

(10) Patent No.: US 12,528,234 B2
(45) Date of Patent: Jan. 20, 2026

(54) MOLDING CORE FOR MANUFACTURING A HOLLOW OMC PART

(71) Applicant: SAFRAN, Paris (FR)

(72) Inventors: Pierre Jean Sallot, Moissy-Cramayel (FR); Mirna Bechelany, Moissy-Cramayel (FR); Nicolas Tran, Moissy-Cramayel (FR)

(73) Assignee: SAFRAN, Paris (FR)

( * ) Notice: Subject to any disclaimer, the term of this patent is extended or adjusted under 35 U.S.C. 154(b) by 125 days.

(21) Appl. No.: 18/579,342

(22) PCT Filed: Jul. 6, 2022

(86) PCT No.: PCT/FR2022/051355
§ 371 (c)(1),
(2) Date: Jan. 13, 2024

(87) PCT Pub. No.: WO2023/285750
PCT Pub. Date: Jan. 19, 2023

(65) Prior Publication Data
US 2024/0342963 A1    Oct. 17, 2024

(30) Foreign Application Priority Data

Jul. 16, 2021  (FR) .................... 2107727

(51) Int. Cl.
| | |
|---|---|
| B29C 33/54 | (2006.01) |
| B22C 9/10 | (2006.01) |
| B22D 29/00 | (2006.01) |
| B29C 33/52 | (2006.01) |
| B29C 70/48 | (2006.01) |

(Continued)

(52) U.S. Cl.
CPC ............... B29C 33/54 (2013.01); B22C 9/10 (2013.01); B22D 29/002 (2013.01); B29C 33/52 (2013.01); B29C 70/48 (2013.01); *B29D 99/0028* (2013.01); *B29K 2909/04* (2013.01); *B29L 2031/08* (2013.01)

(58) Field of Classification Search
CPC ......... B29C 33/52; B29C 33/54; B29C 70/48; B29K 2909/04; B29D 99/0028; B29L 2031/08; B22C 9/10; B22D 29/002
See application file for complete search history.

(56) References Cited

U.S. PATENT DOCUMENTS

| | | | |
|---|---|---|---|
| 4,187,266 A | 2/1980 | Greskovich et al. | |
| 12,121,955 B1 * | 10/2024 | Sallot ................ | B22D 29/002 |
| 2007/0056709 A1 | 3/2007 | Schmidt et al. | |

OTHER PUBLICATIONS

French Search Report issued in French Application FR 2107727 on Mar. 22, 2022 (7 pages).

(Continued)

*Primary Examiner* — Jerzi H Moreno Hernandez
(74) *Attorney, Agent, or Firm* — Bookoff McAndrews, PLLC

(57) ABSTRACT

Molding core for manufacturing an OMC hollow aeronautical part, in particular a fan module part, including a composite material including on the one hand a first phase of formula $M_{n+1}AlC_n$, where n=1 to 3, and M being a transition metal selected from the group consisting of titanium, niobium, chromium or zirconium, the composite material including on the other hand a second phase of formula $Al_4C_3$.

8 Claims, 3 Drawing Sheets

(51) Int. Cl.
  *B29D 99/00* (2010.01)
  *B29L 31/08* (2006.01)

(56) References Cited

OTHER PUBLICATIONS

International Search Report issued in International Application PCT/FR2022/051355 on Oct. 20, 2022 (2 pages).

\* cited by examiner

[Fig. 1]
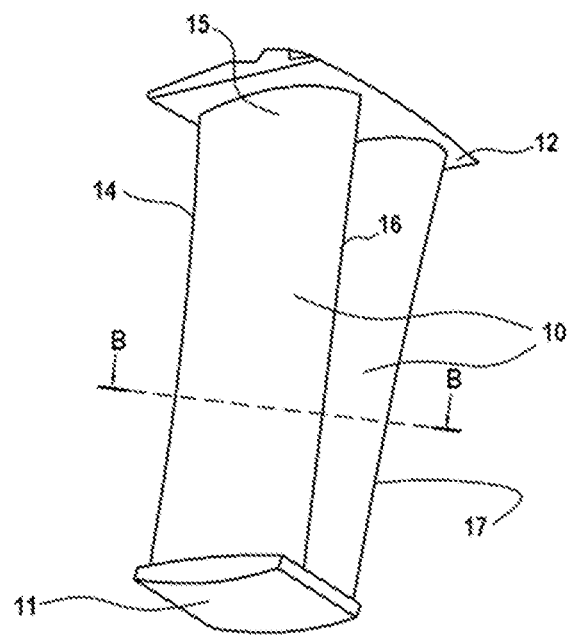
[Fig. 2]
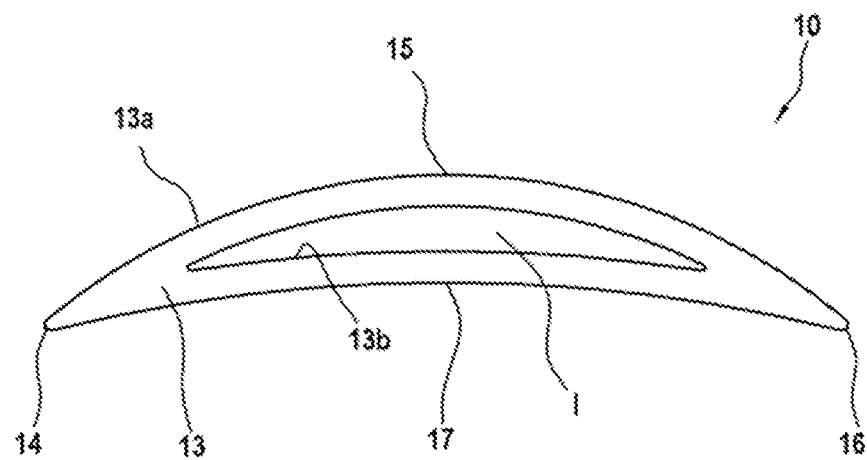

[Fig. 3]
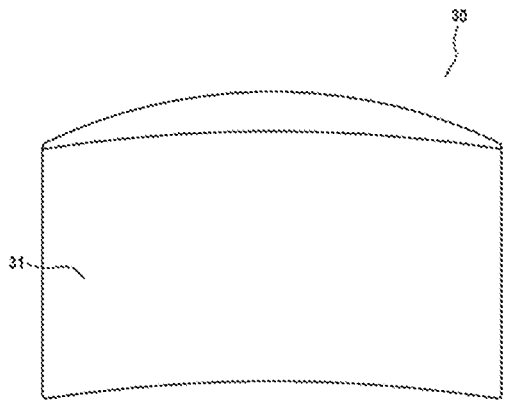
[Fig. 4]
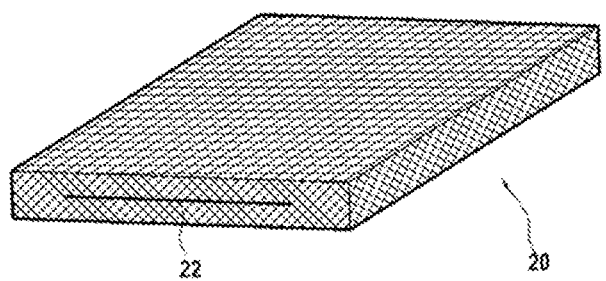
[Fig. 5]
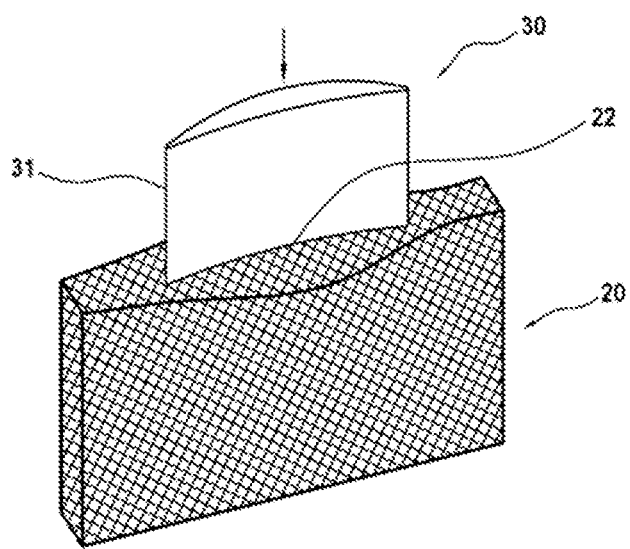

[Fig. 6]
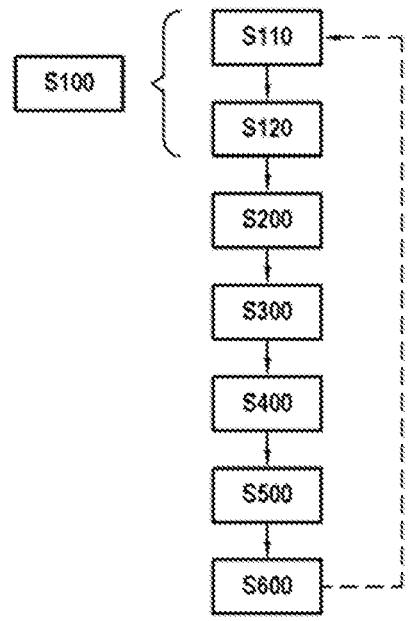
[Fig. 7]
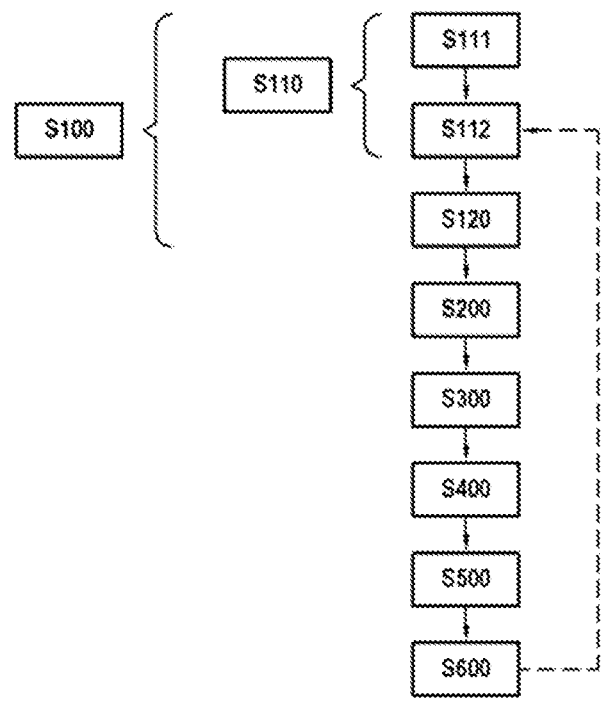

MOLDING CORE FOR MANUFACTURING A HOLLOW OMC PART

CROSS-REFERENCE TO RELATED APPLICATIONS

This is a National Stage Application under 35 U.S.C. § 371 of International Application No. PCT/FR2022/051355, filed Jul. 6, 2022, now published as WO 2023/285750 A1, which claims priority to French Patent Application No. 2107727, filed on Jul. 16, 2021.

TECHNICAL FIELD

The invention relates to the manufacture of OMC hollow aeronautical parts, in particular aeronautical turbomachine blades, in particular by methods involving the injection of resin into a fibrous preform, but not exclusively. More precisely, the invention relates to the molding core used in the manufacture of hollow aeronautical parts, to a method of manufacturing such a molding core, and to a method of manufacturing such an aeronautical part.

PRIOR ART

Parts made from organic matrix composite (OMC) materials are commonly used in aeronautical engines such as aircraft turbomachines to reduce their mass, while guaranteeing the desired mechanical properties, in particular, their stiffness. In particular, these composites are commonly used in the manufacture of fan module parts, such as fan blades or outlet guide vanes (OGVs). These composites can be obtained using a fibrous reinforcement made from a three-dimensional weave in which the threads interweave in a three-dimensional manner (so-called "3D interlock" weave) and which is impregnated in a matrix, the latter being injected by liquid means, for example using the VARTM (Vacuum Resin Transfer Molding) method. Methods such as stamping or thermocompression can also be used.

Furthermore, most fan module parts have a hollow internal structure and include cavities, or have complex external shapes. These hollow structures are obtained by using a mandrel, or insert, or molding core, inserted into the fibrous preform prior to resin injection, or thermocompression, or stamping, during part manufacture. By way of a non-limiting example, a VARTM method for manufacturing an OMC hollow part comprises the following steps:
  manufacturing the fibrous preform (e.g., by ply lay-up, 3D interlock weaving, braiding or winding),
  inserting a mold core to form the cavity or complex outer shape,
  placing the preform in an injection tooling,
  closing the injection tooling,
  injecting resin,
  consolidating the resin,
  demolding the part,
  extracting the molding core forming the cavity.

In addition, to further increase weight savings, composite structures can be further optimized, for example by making the geometries of the internal cavities more complex.

For this purpose, solutions exist that enable the creation of internal cavities or external geometries that cannot be demolded. Among these solutions, bladder-shaped molding cores or expandable mandrels (e.g., in silicone) can be used. However, these solutions require the use of complex and potentially costly rigid tooling assemblies.

Soluble cores are also available for the manufacture of OMC parts. However, these solutions do not allow for the recycling of dissolved cores, and the material resulting from dissolution at the end of the method cannot be discharged into wastewater for environmental reasons, particularly in the presence of nitrate, for example. In addition, the conditions (temperature rise, solvents) required to dissolve the cores are likely to degrade the chemical and mechanical properties of the OMC composite material.

In addition, OMC composite materials offer a wide range of thermal expansion coefficients, which current solutions do not systematically allow to be taken into account during the curing and cooling steps, in particular to ensure that the molding core forming the cavity or the external geometry of the part has the correct geometry and does not degrade due to the stresses induced during temperature changes.

Finally, current solutions are not necessarily machinable due to their intrinsic fragility, which limits the realization of these cores to demoldable shapes.

There is therefore a need for a solution that at least partially alleviates the aforementioned drawbacks.

DISCLOSURE OF THE INVENTION

The present disclosure relates to a molding core for the manufacture of an OMC hollow aeronautical part, in particular a fan module part, comprising a composite material comprising on the one hand a first phase of formula $M_{n+1}AlC_n$, where n=1 to 3, and M being a transition metal selected from the group consisting of titanium, niobium, chromium or zirconium, the composite material comprising on the other hand a second phase of formula $Al_4C_3$.

It is understood that the first phase is of the "MAX phase" type, a crystalline structure of generic formula $M_{n+1}AX_n$, combining characteristics of both metals and ceramics, and in particular exhibiting good thermal and electrical conductivity, good machinability, as well as tolerance to damage and resistance to high-temperature oxidation.

In the present disclosure, the use of aluminum at site A and carbon at site X ensures good chemical compatibility with the $Al_4C_3$ phase.

Furthermore, the titanium, niobium, chromium or zirconium used at site M have good mechanical strength at room temperature and up to 300° C., enabling the composite material comprising these elements to retain sufficient rigidity when manufacturing the OMC hollow part.

In addition, combining this first phase with a second phase of formula $Al_4C_3$, is particularly advantageous. Aluminum carbide ($Al_4C_3$) is an inorganic compound with a very high melting point (2200° C.), which can easily be hydrolyzed at room temperature in the presence of a water-rich atmosphere. Thus, the composite material used for the molding core of the present disclosure incorporates this second phase of aluminum carbide at the grain boundaries of the first phase. This makes the composite material particularly reactive to water-containing atmospheres. Degradation of the aluminum carbide is accompanied by a change in volume and the release of gas, which can fragment the grain boundary and propagate cracks in the initial first phase. In this way, the hydrolysis phenomenon can be propagated over relatively long distances, facilitating core fragmentation and knockout. In other words, the composite material forming the core can be dense and massive initially, and reduced to powder by hydrolysis.

On the other hand, the chemical gradient between the aluminum carbide and the first phase containing aluminum and carbon is very limited, thus limiting interdiffusion between the different chemical elements during the core shaping and casting steps. In addition, once the core has been knocked out, a fragmented material composed of grains of the first phase and hydrated aluminum can be recovered. After drying, this material can be "recharged" with $Al_4C_3$ and reused to manufacture new molding cores.

The composite material of the molding core according to the present disclosure thus combines the aforementioned advantages associated with the compounds of the first phase, with the use of a second phase of formula $Al_4C_3$, enabling the production of hollow structures of complex shapes, while allowing easy and rapid knockout of the cores, without having to resort to chemical solutions potentially harmful to the part manufactured subsequently and to the environment, and which can be recycled.

In some embodiments, the first phase is of one of the formulae among $Ti_3AlC_2$, $Ti_2AlC$, $Cr_2AlC$, $Zr_2AlC$, $Zr_3AlC_2$, $Nb_4AlC_3$, or $Nb_2AlC$.

These phases have increased mechanical strength at room temperature, close to that of ceramics, but with better ductility than the latter, and high electrical conductivity enabling them to be machined by electroerosion, making them easier to use.

In some embodiments, the composite material comprises between 1 and 50% second phase by volume of the composite material, preferably between 1 and 20%. These values ensure fragmentation of the composite material by hydrolysis, while leaving a sufficient volume of first phase in the composite material, enabling the technical advantages associated with this first phase to be retained. In addition, this $Al_4C_3$ phase fraction ensures the chemical stability of the material at high temperatures, while at the same time allowing hydrolysis to be induced to facilitate knockout.

The present disclosure also relates to a method of manufacturing a molding core for the production of an OMC hollow aeronautical part, in particular a fan module part, the molding core comprising a composite material comprising on the one hand a first phase of formula $M_{n+1}AlC_n$, where n=1 to 3 and M being a transition metal selected from the group consisting of titanium, niobium, chromium or zirconium, the composite material comprising on the other hand a second phase of formula $Al_4C_3$, the molding core being obtained by a powder metallurgy process comprising a mixing step in which powders for obtaining the composite material are mixed, and a shaping step.

The powder mixture used to obtain the composite material may comprise a mixture of pure powders of carbon, aluminum, titanium, and/or niobium, and/or chromium and/or zirconium and/or zirconium carbide, and/or niobium carbide, and/or chromium carbide, and/or chromium carbide, and/or aluminum carbide, and/or titanium carbide. In other words, the composite material constituting the molding core is obtained by reacting the various powders of the constituent elements of this material at high temperature. The advantage of this method is that the $Al_4C_3$, phase is involved in the production of the composite material, providing the necessary Al and C elements, thus offering the aforementioned advantages.

In addition, the shaping step can comprise the injection of a binder onto a powder called "binder jetting", the injection of a mixture of metal powder and a thermoplastic polymer called "Metal Injection Molding" (MIM) or any other suitable known 3D printing process, preferably followed by sintering, or SPS (Spark Plasma Sintering), for example.

In some embodiments, the mixing step comprises mixing pure powders constituting the first phase to obtain the first phase in powder form, then mixing said first phase in powder form with an $Al_4C_3$ powder to obtain the second phase.

In other words, pure powders of carbon, aluminum, titanium, niobium, chromium or zirconium and/or zirconium carbide, and/or niobium carbide, and/or chromium carbide, and/or chromium carbide, and/or aluminum carbide, and/or titanium carbide are mixed first to form the first phase, and then the first phase obtained is mixed with aluminum carbide powder to form the second phase. This improves control over the proportions of each phase.

In some embodiments, the mixing step comprises mixing pure powders constituting the first phase with excess $Al_4C_3$ powder to form the composite material in a single operation.

In other words, according to this configuration, powder mixing is not carried out in two steps (firstly, the first phase is produced, then mixing with aluminum carbide powder), but the aforementioned pure powders are mixed in the same operation with an excess of $Al_4C_3$ powder, i.e., in over-stoichiometry, enabling the composite material to be formed "in situ". By reacting the $Al_4C_3$ powder in over-stoichiometry with the desired first phase, it is possible to maintain a controlled volume fraction of this phase in the final material.

The present disclosure also relates to a method of manufacturing an OMC hollow aeronautical part using a molding core obtained by a method according to any of the preceding embodiments, the method comprising, after steps of inserting the molding core into a fibrous preform, impregnating a resin into the fibrous preform and solidifying the resin, a step of knockout the molding core by steaming.

In other words, after solidification or polymerization of the resin in the fibrous preform arranged around the molding core, the assembly is placed in a device, such as an oven, preferably with controlled hygrometry. As already mentioned, the presence of the $Al_4C_3$ phase between the grain boundaries enables the molding core to disintegrate in water-laden air. This facilitates knockout, and in particular improves the knockout of very fine channels, while avoiding the use of chemical solutions, such as acids, which are potentially harmful to the part being manufactured.

In some embodiments, the method comprises, after the knockout step, a recovery step, in which the material knocked out by steaming is recovered so as to be reused in the manufacture of another molding core, starting again from the mixing step.

In other words, once core degradation has taken place, a fragmented material composed of grains of the first phase and hydrated aluminum can be recovered. After drying, this material can be "recharged" with $Al_4C_3$ in the mixing step and thus reused to manufacture new cores. In this way, it is possible to recycle the knocked out molding core, thereby meeting at least part of the above-mentioned environmental concerns

BRIEF DESCRIPTION OF THE DRAWINGS

The invention and its advantages will be better understood on reading the following detailed description of various embodiments of the invention given by way of non-limiting examples. This description refers to the attached pages of figures, on which:

FIG. 1 is a perspective view of two OMC fan module hollow blades,

FIG. 2 is a cross-sectional view, along sectional plane B-B, of the hollow blade shown in FIG. 1, FIG. 3 is a perspective view of a molding core according to the present disclosure, FIG. 4 is a schematic perspective view showing a fibrous preform before insertion of the molding core, FIG. 5 is a schematic perspective view showing the insertion of the molding core of FIG. 3 into the fibrous preform of FIG. 4, FIG. 6 shows schematically the steps of a method for manufacturing an OMC hollow part according to a first embodiment in accordance with the disclosure, FIG. 7 shows schematically the steps of a method of manufacturing an OMC hollow part according to a second embodiment as described herein.

DESCRIPTION OF THE EMBODIMENTS

FIG. 1 shows a perspective view of a fan module. More specifically, FIG. 1 shows outlet guide vanes (OGV) 10, intended to be arranged downstream of fan blades to straighten a secondary air flow. This example is not limitative, as the invention also applies to fan blades, for example, or any other fan module in OMC. The outlet guide vanes 10 (or fan blades), are made of an organic composite material (OMC) with a fibrous reinforcement embedded in a matrix. In addition, the outlet guide vanes 10 extend radially between a casing 11 of the turbomachine and the nacelle 12. They each comprise a leading edge 14, a trailing edge 16, an extrados 15 and an intrados 17.

FIG. 2 shows the internal structure of an outlet guide vane 10, in a radial sectional plane B-B of FIG. 1. The outlet guide vane 10 has a hollow structure. More specifically, it comprises an outer skin 13, whose outer surface 13a defines the aerodynamic profile of the vane, and whose inner surface 13b defines an inner cavity I.

Such a blade can be obtained by known methods such as resin transfer molding (RTM) into a fibrous preform, thermocompression or stamping. Whatever the method used, the hollow structure of the blades is obtained by inserting into the preform, during the manufacturing method, a molding core 30, produced during a preliminary step of the method, and whose shape corresponds to the shape of the internal cavity I of the blade to be manufactured.

Such a molding core 30 according to the present disclosure is shown in perspective in FIG. 3. The molding core 30 according to the present disclosure comprises a side wall 31 intended to form the inner surface 13b of the outer skin 13 of the outlet guide vane 10, and thus the inner cavity of the outlet guide vane 10. It further comprises a composite material to facilitate removal of this core 30, during the knockout step described later.

In fact, the composite material comprises two phases: a first phase called "MAX phase", and a second phase of formula $Al_4C_3$, in other words aluminum carbide.

The MAX phases are so-called stoichiometric materials, known per se, of the formula: $M_{n+1}AX_n$, with n=1 to 3, M being a transition metal, A an element of group A and X carbon and/or nitrogen.

The first phase is determined in such a way as to have good chemical compatibility with $Al_4C_3$ at high temperature, in order to avoid interaction of this phase with the MAX phase during sintering steps, for example. Thus, in the present disclosure, the element used in group A is aluminum (Al), and the element used at site X is carbon (C). Phases containing nitrogen (N) are not sufficiently chemically compatible with the $Al_4C_3$ phase. Finally, the element used at site M can be titanium (Ti), chromium (Cr), niobium (Nb) or zirconium (Zr).

Thus, in the application of the present disclosure, the first phase used may be of formulae $Ti_3AlC_2$, $Ti_2AlC$, $Cr_2AlC$, $Zr_2AlC$, $Zr_3AlC_2$, $Nb_4AlC_3$, or $Nb_2AlC$.

The second phase, of formula $Al_4C_3$ is a known carbide with a very high melting point (2200° C.). It is also aluminoforming at high temperatures. However, a particularly advantageous property of the invention is the ease with which this phase hydrolyzes at room temperature in the presence of a water-rich atmosphere. The decomposition of this phase follows the following reaction:

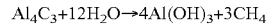

$$Al_4C_3 + 12H_2O \rightarrow 4Al(OH)_3 + 3CH_4$$

This reaction can be catalyzed by optimizing both the hygrometry level and the temperature.

Thus, given the presence of the second phase of formula $Al_4C_3$, between the grain boundaries of the first phase, the molding core 30 comprising this composite material can be easily eliminated by being degraded by hydrolysis, at the end of the blade manufacturing method.

In this respect, in the example described below, the method for manufacturing an OMC hollow aeronautical part according to the present disclosure, in particular a fan module, here outlet guide vanes 10, is a resin injection process in a fibrous preform. The various steps of this process, according to a first embodiment, are shown in FIG. 6.

The first step S100 of this method consists of manufacturing the molding core 30 described above, which is then used to manufacture hollow turbomachine outlet guide vanes 10.

The molding core 30 thus produced in step S100 is then inserted into a fibrous preform 20, or fibrous reinforcement, shown in FIG. 4 and intended to form the outer skin 13 of the blade 10 (step S200). The fibrous preform 20 is formed, for example, from a three-dimensional weave in which the threads interweave in a three-dimensional manner (so-called "3D interlock" weave). The manufacture of such a fibrous preform is known to the person skilled in the art and will not be described in detail here. It should be noted, however, that the fibrous preform 20 comprises a non-interlinked zone 22 extending along the entire length of the preform, enabling two parts of the fibrous preform 20 to be separated locally at the non-interlinked zone 22. The opening created by the separation of these two parts enables the molding core 30 to be inserted. The S200 step of inserting the molding core 30 into the fiber preform 20 is shown in FIG. 5.

Thus, at the end of this step and taking into account the shape of the molding core 30, the fibrous preform 20 itself takes on the desired shape of the final part, subject to any compression and finishing steps required at the end of the method. In particular, in the case of the outlet guide vane 10 according to the present embodiment, the fibrous preform 20 arranged around the molding core 30 adopts the curvature and camber of the final part, shown in FIG. 2.

A matrix, such as a thermosetting or thermoplastic resin, is then injected into the fibrous preform 20, enabling the part to be densified and consolidated (step S300). To do this, the molding core 30/fibrous preform 20 assembly is arranged and held in a conforming tooling (not shown) known per se, at least until the preform is rigidified (or consolidated).

A heat treatment is then carried out to polymerize or harden the resin (step S400), during which the assembly is heated to harden the resin and produce the final rigid part.

Finally, the molding core 30 is removed by knockout, to obtain the final hollow part shown in FIG. 2 for example (step S500).

In accordance with the present disclosure, step S100 for manufacturing the molding core 1 is divided into several steps. First, metal powders are mixed together to form a composite powder comprising the first and second phases (step S110). According to the first embodiment, pure powders of aluminum (Al), carbon (C), niobium (Nb), and/or chromium (Cr), and/or titanium (Ti), and/or zirconium (Zr), and/or aluminum, titanium, and/or niobium, and/or chromium and/or zirconium and/or carbide (ZrC), and/or niobium carbide (NbC), and/or chromium carbide (CrC), and/or chromium carbide ($Cr_7C_3$), and/or titanium carbide (TiC), are mixed with an excess of aluminum carbide ($Al_4C_3$) powder, so as to form in situ a composite material comprising the first phase and the second phase, such that the second phase represents between 1 and 50%, preferably between 1 and 20%, of the total volume of the composite material.

Once the mixing step has been completed, the molding core 30 is shaped (step S120) to the desired form. This step can be carried out by various known methods, such as binder jetting, injection of a mixture of metal powder and a thermoplastic polymer, or any other suitable known 3D printing process, preferably followed by conventional debinding and/or sintering, or non-conventional debinding and/or sintering such as SPS (Spark Plasma Sintering), or any other suitable known method, or a combination of these methods.

The molding core 30 thus obtained can then be used in the standard method for manufacturing OMC hollow parts described above, in particular in step S200 for inserting the core 30 into the fibrous preform 20.

Alternatively, the above-mentioned step S500, comprising the knockout of the molding core 30, can be carried out by placing the assembly in a humidity-controlled oven (relative humidity RH>50%) or preferably in a steam autoclave, at temperatures of between 10° and 180° C., and pressures of between 6 and 12 bar. Applying pressure accelerates the knockout kinetics, while facilitating access of vapors to the thin sections.

Finally, the knockout step S500 can be followed by a recovery step (step S600), or recycling, in which the composite material knocked out by steaming, then in powder form, is recovered so as to be reused for the manufacture of another molding core 30, starting again from mixing step S110. More precisely, once the core has been degraded, a fragmented material composed of grains of the first phase and hydrated aluminum is recovered. After drying, this material can be "recharged" with $Al_4C_3$ and reused to manufacture new molding cores 30.

The various steps in a method for manufacturing blades by injecting resin into a fibrous preform according to a second embodiment of the present disclosure are shown in FIG. 7.

The method according to the second embodiment differs from the method according to the first embodiment in that powder mixing step S110 is divided into two sub-steps. Whereas in the first embodiment, the mixing step is carried out in a single operation, in which the composite material is formed in situ by the presence of excess $Al_4C_3$ phase, the S110 powder mixing step in the second embodiment comprises firstly mixing the pure powders making up the first phase to obtain the first phase (step S111), then mixing the first phase thus obtained with an $Al_4C_3$ powder to obtain the composite material ex situ (step S112).

For example, in step S111, a first phase of formula $Nb_4AlC_3$ can be obtained by mixing pure niobium, aluminum and niobium carbide powders (Nb:Al:NbC) in molar proportions of 1.2:1.1:2.8 respectively. In this case, the niobium grains have a diameter of less than 44 μm, a purity of 99.8%, and a density of 8.57 g/cm³. The aluminum grains have a diameter of less than 44 μm, a purity of 99.5%, and a density of 2.70 g/cm³, and the niobium carbide grains have a diameter of less than 10 μm, a purity of 99%, and a density of 7.82 g/cm³. These different powders can be mixed in an attritor and in a solvent (e.g., ethanol), then subjected to drying and reactive sintering up to 1700° C. The resulting porous mass is ground to powder.

Also by way of example, in step S111, a first phase of formula $Ti_3AlC_2$ can be obtained by mixing pure titanium, aluminum and titanium carbide powders (Ti:Al:TiC) in molar proportions of 1:1.05:1.9 respectively. In this case, the titanium grains have a diameter of less than 45 μm and a purity of 99.5%. The aluminum grains have a diameter of between 45 and 150 μm, a purity of 99.5% and the titanium carbide grains have a diameter of 2 μm, a purity of 99.5%, and a density of 7.82 g/cm³. These different powders can be mixed in a ball mixer, then subjected to reactive sintering up to 1450° C. The resulting porous mass is ground to powder.

It should also be noted that, in step S111, the pure powders can also be mixed with $Al_4C_3$ powder. In this case, the $Al_4C_3$ powder contributes to the formation of the first phase, but is not in sufficient quantity to form the composite material in situ, so that the second step S112 is necessary, and makes it possible to add a necessary quantity of $Al_4C_3$ powder, making it possible to obtain the previously mentioned proportions of $Al_4C_3$ in the composite material.

Although the present invention has been described with reference to specific embodiments, it is obvious that modifications and changes can be made to these embodiments without departing from the general scope of the invention as defined by the claims. In particular, individual features of the various illustrated/mentioned embodiments may be combined in additional embodiments. Consequently, the description and drawings are to be considered in an illustrative rather than restrictive sense.

It is also evident that all features described with reference to a method are transposable, alone or in combination, to a device, and conversely, all features described with reference to a device are transposable, alone or in combination, to a method.

The invention claimed is:

1. A molding core for manufacturing an organic matrix composite hollow aeronautical part comprising a composite material comprising a first phase, the first phase is of one of a formulae among $Ti_3AlC_2$, $Cr_2AlC$, $Zr_2AlC$, or $Zr_3AlC_2$, the composite material comprising on the other hand a second phase of formula $Al_4C_3$.

2. The molding core according to claim 1, wherein the composite material comprises between 1 and 50% second phase by volume of the composite material.

3. The molding core according to claim 1, wherein the composite material comprises between 1 and 20% second phase by volume of the composite material.

4. A method of manufacturing a molding core for a production of an organic matrix composite hollow aeronautical part the molding core comprising a composite material comprising a first phase, the first phase is of one of a formulae among $Ti_3AlC_2$, $Cr_2AlC$, $Zr_2AlC$, or $Zr_3AlC_2$, the composite material comprising a second phase of formula $Al_4C_3$, the molding core being obtained by a powder metallurgy process comprising a mixing step in which powders for obtaining the composite material are mixed, and a shaping step.

5. The method according to claim 4, wherein the mixing step comprises mixing pure powders constituting the first phase so as to obtain the first phase in powder form, then mixing said first phase in powder form with an $Al_4C_3$ powder so as to obtain the second phase.

6. The method according to claim 4, wherein the mixing step comprises mixing pure powders constituting the first phase with excess $Al_4C_3$ powder so as to form the composite material in a single operation.

7. A method of manufacturing an organic matrix composite hollow aeronautical part using a molding core obtained by a method of manufacturing a molding core, the molding core comprising a composite material comprising a first phase of formula $M_{n+1}AlC_n$, where n=1 to 3 and M being a transition metal selected from the group consisting of titanium, niobium, chromium or zirconium, the composite material comprising a second phase of formula $Al_4C_3$, the molding core being obtained by a powder metallurgy process comprising a mixing step in which powders for obtaining the composite material are mixed, and a shaping step, the method of manufacturing an organic matrix composite hollow aeronautical part comprising, after steps of inserting the molding core into a fibrous preform, impregnating a resin into the fibrous preform and solidifying the resin, a step of knockout the molding core by steaming.

8. The method according to claim 7, comprising, after the knockout step, a recovery step, in which the material knocked out by steaming is recovered so as to be reused in the manufacture of another molding core starting again from the mixing step.

* * * * *